(12) United States Patent
Mogul et al.

(10) Patent No.: US 9,325,569 B2
(45) Date of Patent: Apr. 26, 2016

(54) IMPLEMENTING A SOFTWARE DEFINED NETWORK USING EVENT RECORDS THAT ARE TRANSMITTED FROM A NETWORK SWITCH

(75) Inventors: Jeffrey C. Mogul, Menlo Park, CA (US); Paul T Congdon, Granite Bay, CA (US); Dwight L Barron, Houston, TX (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 344 days.

(21) Appl. No.: 13/539,090

(22) Filed: Jun. 29, 2012

(65) Prior Publication Data

US 2014/0003422 A1    Jan. 2, 2014

(51) Int. Cl.
*H04L 12/56*      (2006.01)
*H04L 12/24*      (2006.01)

(52) U.S. Cl.
CPC .......... *H04L 41/069* (2013.01); *H04L 41/0681* (2013.01); *H04L 41/0686* (2013.01)

(58) Field of Classification Search
CPC ............ H04L 41/0806; H04L 47/2441; H04L 12/2437; H04L 69/22
USPC .................. 370/242, 254, 368, 382, 389, 394; 709/244, 226
See application file for complete search history.

(56) References Cited

U.S. PATENT DOCUMENTS

| 4,982,421 | A | * | 1/1991 | Kirsch et al. ............. 379/216.01 |
|---|---|---|---|---|
| 2005/0177644 | A1 | * | 8/2005 | Basso et al. .................... 709/232 |
| 2007/0002761 | A1 | * | 1/2007 | Diamant et al. ............... 370/252 |
| 2009/0089414 | A1 | * | 4/2009 | Jaladanki et al. ............. 709/224 |
| 2012/0323381 | A1 | * | 12/2012 | Yadav et al. ................... 700/286 |
| 2013/0227611 | A9 | * | 8/2013 | Grauch et al. ................... 725/46 |
| 2013/0268619 | A1 | * | 10/2013 | Vasudevan et al. ........... 709/213 |
| 2013/0311675 | A1 | * | 11/2013 | Kancherla ...................... 709/244 |
| 2013/0318243 | A1 | * | 11/2013 | Chinthalapati et al. ........ 709/226 |

FOREIGN PATENT DOCUMENTS

WO     WO2013104375 A1 *   3/2012     ........... H04L 12/24

OTHER PUBLICATIONS

Ben Pfaff et al. "OpenFlow Switch Specification", version 1.1.0, Feb. 28, 2011.*
Ben Pfaff et al. "Open Flow Switch Specification", version 1.1.0, Feb. 28, 2011.*

\* cited by examiner

*Primary Examiner* — Andrew Chriss
*Assistant Examiner* — Peter Mak
(74) *Attorney, Agent, or Firm* — Mahamedi Paradice LLP

(57) ABSTRACT

Each of a plurality of data packets that is received on a network switch can be associated with a corresponding event record that identifies one or more flow table rules for that data packet. A plurality of event records, which individually can correspond to one or more of the data packets, is transmitted to a programmable resource for use in controlling a Software Defined Network.

14 Claims, 2 Drawing Sheets

IMPLEMENTING A SOFTWARE DEFINED NETWORK USING EVENT RECORDS THAT ARE TRANSMITTED FROM A NETWORK SWITCH

BACKGROUND

Data networks, such as data centers, increasingly rely on Software-Defined Networks (SDN) to control data flows and switching behavior. An SDN, rather than putting all networking-related complexity into the individual switches, instead employs a set of relatively simple switches, managed by a central controller.

OpenFlow is a communication protocol utilized by some SDNs. In OpenFlow, the controller provides each switch with a set of "flow rules." A flow rule consists primarily of pattern that is matched against a flow key extracted from the fields within a packet. The flow rules specify a set of actions that should be carried out if a packet matches that rule. The flow rules also specify a set of counters that should be incremented if a packet matches the rule. OpenFlow specifies a packet counter and a byte counter for each rule.

DETAILED DESCRIPTION

Figure 1:
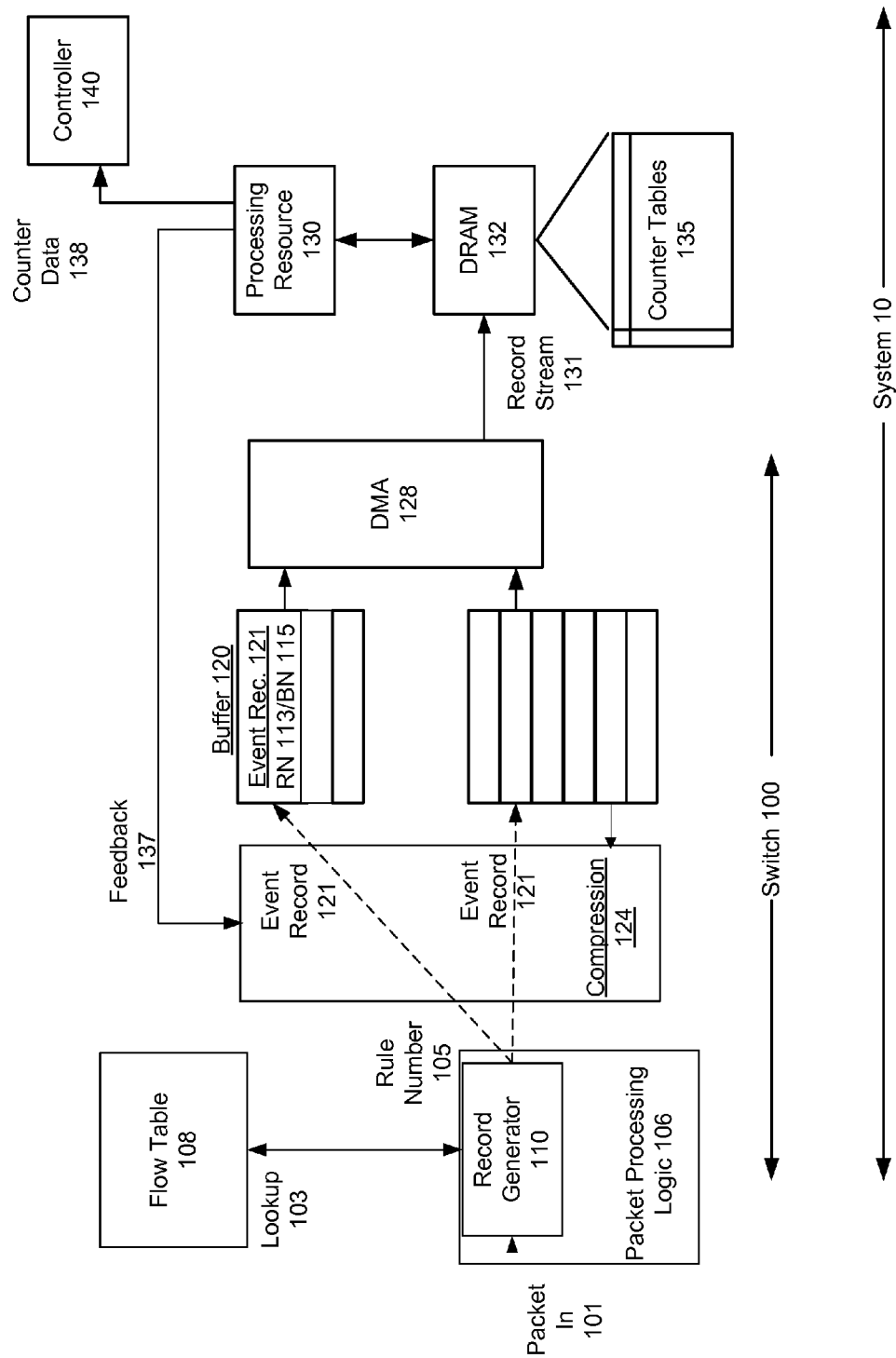
FIG. 1 illustrates an example system for operating a network switch for a software defined network.

Examples embodiments described herein provide for a Software-Defined Network (SDN) that is implemented using event records that are generated on a switch for the network. As described with various examples, event records can be generated for individual data packets received on a switch, and transmitted in chunks to a programmable resource that uses the event records to implement some of the functionality of the SDN. Among other benefits, the programmable resource can be programmed to implement functionality that is responsive to information provided with the event records. For example, a counter table can be constructed for the switch in a DRAM resource of the programmable resource based on the event records that are received from the switch. The counter tables can be used to implement, for example, control or policies for the SDN.

Some examples provided herein implement a network switch for an SDN using event records for incoming data packets. In particular, each of a plurality of data packets that are received on a network switch can be associated with a corresponding event record that identifies one or more flow table rules for that data packet. A plurality of event records, which individually can correspond to one or more of the data packets, is transmitted to a programmable resource for use in controlling the SDN.

In a variation, a network switch is provided for an SDN. The network switch can include a flow table, an event record generator, a buffer, and a transmission component. The event record generator determines an event record for an incoming data packet. The event record generator references the incoming data packet to an entry for the flow table in order to determine a rule number for the incoming data packet. The record event for the incoming data packet identifies the rule number and a size of the incoming data packet. The buffer maintains a plurality of event records for a plurality of data packets that are received by the network switch. The transmission component transmits a set of multiple event records from the buffer to an external programmable resource.

Still further, a switching system is provided for an SDN. The switching system includes a programmable resource, a memory associated with the programmable resource, and a network switch. The switching system can also include a controller for the SDN. The controller can receive input, such as in the form of reports, from the programmable resource. The reports provide an example of input that can be provided to a controller of an SDN in order to implement functionality for managing the SDN.

In various examples, the controller can instruct the network switch and/or its associated programmable resource to generate reports when certain trigger conditions are met, with respect to the value of certain counters or the transmission of certain event records.

Among other benefits, examples described herein enable considerable more flexibility in the manner in which an SDN can be controlled. In contrast to conventional approaches, for example, which utilize Application Specific Integrated Circuits (ASIC) to maintain counters for use with an SDN, examples described herein can effectively generate and maintain software-based counters that can be utilized by other programmatic components to implement input and control for the SDN. Furthermore, the software-based counters can be maintained off the ASIC of the network switch, so that the construct of the network switch (e.g., ASIC design) is independent of the functionality provided with maintaining and using the software-based counters. Additionally, the network switch is not burdened with the size and performance requirements of maintaining counters.

Communication protocols for SDNs (e.g., Open Flow) are typically based on a set of flow rules, each of which has a set of associated counters. Example embodiments such as described herein recognize that an alternative to discrete hardware counters can be implemented in the form of a log that is maintained on a switch (e.g., implemented on the ASIC of the switch) and transmitted to an attached processing resource (e.g., CPI or other processing resource).

Embodiments described herein recognize that one challenge posed by the use of OpenFlow switches, for example, is that such switches require support from a sufficiently large set of counters (e.g., one per rule). These counters often need to be updated at "line rate"—that is, as fast as the switch can forward packets, which often yields very little time for an update. The contents of the counters, or of a specified subset, need to be conveyed to the controller.

Some examples described herein provide for creation of event records or incoming and matched data packets. In implementation, event records can be stored on, for example, the ASIC of the network switch in a modest-sized buffer (e.g., of size B bytes). The event records can be created as a stream that is efficiently transmitted in, for example, B-byte chunks to a switch-local processing resource (e.g., CPU).

One or more embodiments described herein provide that methods, techniques and actions performed by a computing device (e.g., node of a distributed file system) are performed programmatically, or as a computer-implemented method. Programmatically means through the use of code, or computer-executable instructions. A programmatically performed step may or may not be automatic.

Figure 2:
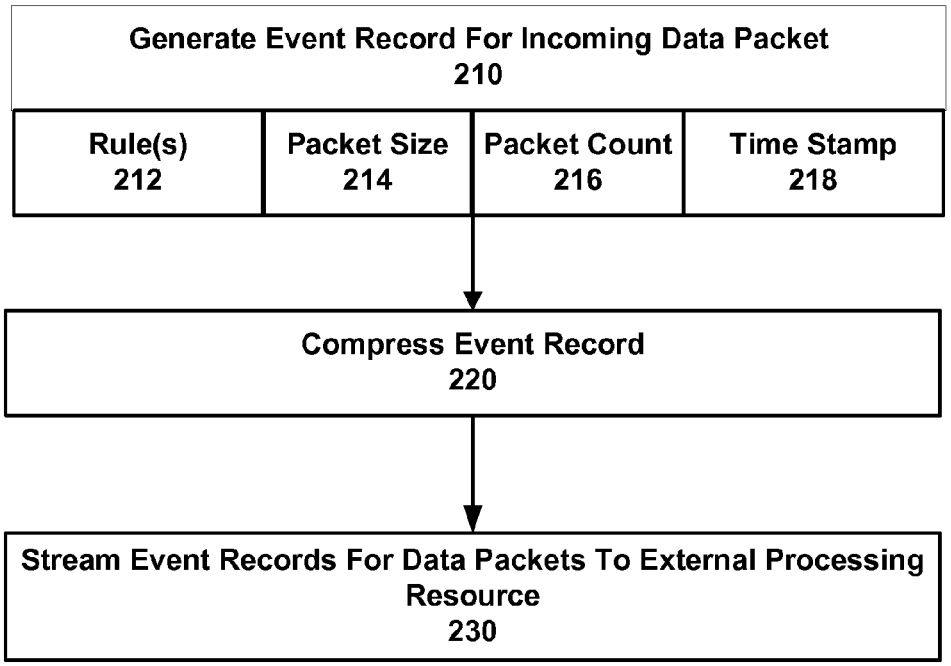
FIG. 2 illustrates an example method for managing a switch to implement a software defined network.

With reference to FIG. 1 or FIG. 2, one or more embodiments described herein may be implemented using programmatic modules or components. A programmatic module or component may include a program, a subroutine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

System Description

FIG. 1 illustrates an example system for operating a network switch for an SDN. In particular, a system 10 can include a network switch 100, a processing resource 130, and a memory resource, depicted as a dynamic random access memory (DRAM) 132. The switch 100 can operate to control data packet traffic that is destined for resources of a data network, such as a data center. For examples described herein, the switch 100 can include a record generator 110, flow table 108, compression component 124, and a buffer 120. The switch 100 can be implemented on an application specific integrated circuit (ASIC).

The flow table 108 can hold flow entries. In implementation, the record generator 110 can be implemented as part of a packet processing logic 106. The packet processing logic 106 analyzes an individual incoming data packet ("packet in") 101, and uses the header information (e.g., source information, destination information, etc.) embedded in the packet to generate a lookup key 103 from the flow table. The lookup key 103 is used to determine a rule number 105 for the data packet 101. The event record generator 110 generates an event record 121 for individual data packets 101 based on the rule number 105 that is identified for the incoming data packet 101. The flow table 108 can be implemented using a hardware device such as ternary content-addressable memory (TCAM).

In implementation, the generated event records 121 are held in the buffer 120. Each event record 121 is associated with one or more incoming data packets 101, and can include the rule number 113 that the packet has matched to, as well as a number of bytes 115 in the packet. As an example, the rule number 113 can correspond to a small integer, representing one rule from a few thousand or a few hundreds of thousands of rules which can be stored in hardware tables. In implementation, if an assumption is made that at most 2^20 rules are used, a maximum packet length of 2^14 bytes is provided, and a byte-count granularity of 4 bytes is allowed, then each record can be represented in 32 bits (4 bytes). This allows a relatively modest data rate between the switch 100 and, for example, the local processing resource of the switch.

In implementation, the buffer 120 can be split into several blocks. When one of the blocks is full, the switch 100 can stream (e.g., use DMA 128) the event records off the ASIC to DRAM 132 or to the processing resource 130. The buffer 120 can be implemented using, for example, an SRAM of the ASIC of switch 100.

The event records 121 can be transmitted from the buffer 120 to a programmatic resource that implement software or other logic for controlling the switch 100. In an example of FIG. 1, a direct memory access component 128 transmits a record stream 131 to the DRAM 132, or alternatively, to a memory resource that is integrated with the processing resource 130. The processing resource 130 and DRAM 132 can be external to the switch 100. In the example provided, the processing resource 130 is not part of the ASIC that provides the switch 100, but rather is a separate physical component.

In one implementation, processing resource 130 is a central processing unit (CPU) that operates to read the record stream 131 from a random access memory (RAM). In another implementation, the processing resource 130 receives the record stream 131 from the DMA 128. In the example provided, the record stream 131 includes entries and can be stored in the dynamic random access memory (DRAM) 132. The processing resource 130 unpacks the event records from the record stream 131 and updates a representation of counters (e.g., counter tables 135) for the switch stored in the DRAM 132. Thus, as shown in the example, the counter table 135 for the switch 100 is not located on the switch 100, but is software generated by the external processing resource 130.

Each event record of the record stream 131 can represent one data packet and can include two fields. For example, each event record can include (i) ruleNumber—referencing the index of the flow-table rule that the packet matched, or a special value if no rules matched, and (ii) byteCount—referencing the size of the packet. Optionally, the individual event records of the record stream 131 can include a time stamp field.

The time stamp field can be optional considering that the processing resource 130 can provide its own time source. Additionally, the processing resource 130 can omit, for example, a packetcount field (e.g., as provided with OpenFlow) which would normally be present with a conventional ASIC implementation.

In variations, the processing resource 130 corresponds to another ASIC. Still further, the processing resource 130 can correspond to a Field Programming Gate Array (FPGA).

As still another variation, the processing resource 130 can be located on a same ASIC as the buffer 120 and receives the record stream 131 as a local communication. In such a variation, the processing resource 130 can include a memory controller that outputs data to the DRAM 132 or other external memory resource. In such a variation, the output data can include, for example, counter data for storing counter tables or information in the DRAM 132.

In one example embodiment, system 10 can use software or programming to implement counters for controlling, for example, the switch 100. To leverage existing communication protocols such as OpenFlow, the processing resource 130 can implement counter tables 135 based on the record stream 131 communicated from the buffer 120. The counters of the counter table 135 can be used to implement system 10 as, for example, an SDN with functionality and enhancements that would not otherwise be feasible using a configuration in which the ASIC of the network switch maintains the counters. Thus, for example, the processing resource 130 can be programmed as to the manner in which the counter tables 135 for the switch 100 are used. Furthermore, the programming resource 130 can be reprogrammed, and reconfigured as needed to meet changing needs of the SDN.

In some examples, the processing resource 130 can return values and provide other input to a controller 140 for the SDN. The controller 140 can be implemented on, for example, a separate computing device that manages the data network. For example, the controller 140 can be provided on a server that is connected to the system 10 over a network connection. In contrast, the processing resource 130 is typically in close proximity to the switch 100 (e.g., within a few inches). In variations, however, some or all of the functionality provided with the controller 140 can be integrated or provided with the processing resource 130 and DRAM 132, or alternatively with a device that contains the processing resource 130 and DRAM 132. Still further, some or all of the controller 140 can be provided by the ASIC of the switch 100.

In one example, the processing resource 130 can signal counter data 138, such as individual counters or large tables, to the controller 140 for the SDN. Among other benefits, the controller 140 can incur less overhead to access counters, as compared to conventional approaches in which the ASIC of the switch 100 has to be accessed. The reduction in overhead can enhance or otherwise enable software defined network functions that would otherwise be problematic under, for example, a conventional approach in which counter tables are maintained on the ASIC.

In some variations, the processing resource 130 can use standard software techniques to process the event records. The processing resources can, for example, maintain counters in RAM-based data structures.

In some implementations, the processing resource 130 can implement logic (e.g., software) that can optimize the processing of these event records as necessary. For example, the processing resource can filter out events that are deemed not interesting. The processing resource 130 can, for example, use data-structures that are optimized for specific kinds of counter retrievals. Still further, the processing resource 130 can merge counters from multiple ASICs into one data structure (thus allowing the use of less total storage space, and better handling of triggers).

Embodiments recognize that a bandwidth between the switch 100 and the processing resource 130 can be a limiting performance factor for system 100. To promote bandwidth, one or more examples provide for techniques that reduce an amount of data that is communicated from the switch 100 to the processing resource 130. Any one of many possible compression techniques can be implemented to compress the event records 121 in the switch 100. For example, in one implementation, traffic regularities can be identified and exploited in order to compress the record stream 131. For example, in many cases, there is a small subset of rule identifiers that are repeatedly matched more frequently than other rules. There may also be rules in which the actual maximum byte count can be smaller than, for example, 9000 (a standard default maximum byte count). By recognizing that the byte count can be smaller than the default maximum, the size allotted for such operations can similarly be reduced. In still other variations, some event records 121 can be dropped when chosen at random (so as to prevent systematic blind spots).

As another example, if the "working set" of flow rules numbers (identifiers for flow rules that are in use) is likely to be much smaller than the full range, then compression component 124 can implement an algorithm such as Huffman coding, in order to avoid the need for sending full-sized rule number values. Rather, the compression component 124 can reduce the rule number values based on the assumption that the working set is much smaller than the larger full set of rule number values.

Similarly, an embodiment recognizes that certain packet sizes are far more common than others. For example, many data packet distributions are bimodal. Such frequent values could be represented with shorter codes. In such cases, the worst case for event-arrival rates is the best case for this kind of compression, since the byte counts would be equal to a minimum packet length.

As another example for implementing compression, if the working set is small, the compression component 124 can include a small cache indexed by a rule number, where each cache entry contains a rule number field, a packet count field, and a total byte count field. Whenever a newly generated event record 121 has the same rule number as an existing entry in this cache, the cache entry is updated so as to increment its packet count field by one, and to add the packet size to the total byte count. Whenever a newly generated event record 121 does not match an existing entry in this cache, the cache can "evict" an entry by writing its contents into the buffer 120, then clears that entry and initializes it, based on the value of the newly generated event record. In this example, the format of the event records in buffer 120 is expanded to include a packet count field. Additionally, the cache can use any of several well-known mechanisms to choose entries to evict, e.g., random, least-recently-used, or based on a maximum lifetime parameter for each cache entry.

In some variations, the processing resource 130 can also provide a feedback 137 for the compression component 124. The feedback 137 can specify, for example, input regarding the adequacy of the compression (e.g., sufficient information being received).

As an addition or variation, the system 100 can be configured so that the switch 100 connects to multiple processing resources 130 and/or DRAMs 132. Still further, in a variation, the switch 100 can include multiple buffers 120 and DMA engines 128, and thus generate multiple record streams 131. In examples, the ASIC of the switch 100 can include logic to enable designation of which event records should be provided with each event record streams.

As still another alternative or variation, the switch 100 can include multiple ASICs which connect to multiple processing resources or memory resources. Such an implementation offers advantages over conventional multiple-ASIC Open-Flow switches, which provide for maintaining counters on the individual ASICs of the multi-ASIC switch. In contrast, an example provided herein provides for switch 100 to include multiple ASICs that utilize one or more external processing resources 130 and/or memory resources (e.g., DRAM 132). Among other benefits, a multi-ASIC switch in accordance with examples described herein can be used to implement, for example, a software-based trigger functionality, which can be problematic to implement using a conventional multi-ASIC OpenFlow switch. For example, a switch with multiple ASICs, as described with examples herein, can be used to generate a report to the controller 140 when the total number of packets send to TCP port 80 on any set of hosts exceeds a threshold.

Methodology

FIG. 2 illustrates an example method for managing a network switch in the implementation of an SDN. An example method such as described by FIG. 2 can be implemented using, for example, components described with system 100 of FIG. 1. Accordingly, reference is made to elements of FIG. 1 for purpose of illustrating a suitable component for performing a step or sub-step being described.

On the switch, an event record is generated for an incoming packet (210). In one implementation, a lookup key 103 is generated for an incoming packet using, for example, functionality included on the ASIC of switch 100 to process data packets and to generate record entries. The lookup key 103 can be referenced to the flow table 108 to return a rule for the incoming data packet (212). Still further, in some variations, support for multiple data flow tables and rules can be provided. For example, embodiments recognize that Openflow supports multiple data flow tables 108. Multi-table lookups result in event records that could carry two or more rule numbers 113. Thus, for example, in the example of FIG. 2, multiple rules can be returned for the incoming data packet.

As an addition or alternative, the ASIC logic of the switch 100 can also determine a size of the data packet (214). Other information for other fields, such as a packet count field, can also be determined (216). Optionally, a time stamp can be determined for the incoming data packet (218).

In some variations, the event record is compressed (220). The event record can be buffered in, for example, an SRAM component of the switch 100. The compression unit 124 can serve to reduce the actual size of the individual event record. As an addition or alternative, the compression unit 124 can serve to reduce the number of event records by combining or eliminating individual event records. Event records can be compressed in a variety of ways. For example, as described with an example of FIG. 1, the rule number value of an event record can be shrunk based on certain criteria, such as the rule being part of a heavily used set of rules.

The event records can be streamed from the switch 100 to another source, such as the processing resource 130 (230). The event records can be transmitted, for example, in blocks from an SRAM component of switch 100 to the DRAM 132 of the external processing resource 130 using the DMA 128.

Figure 3:
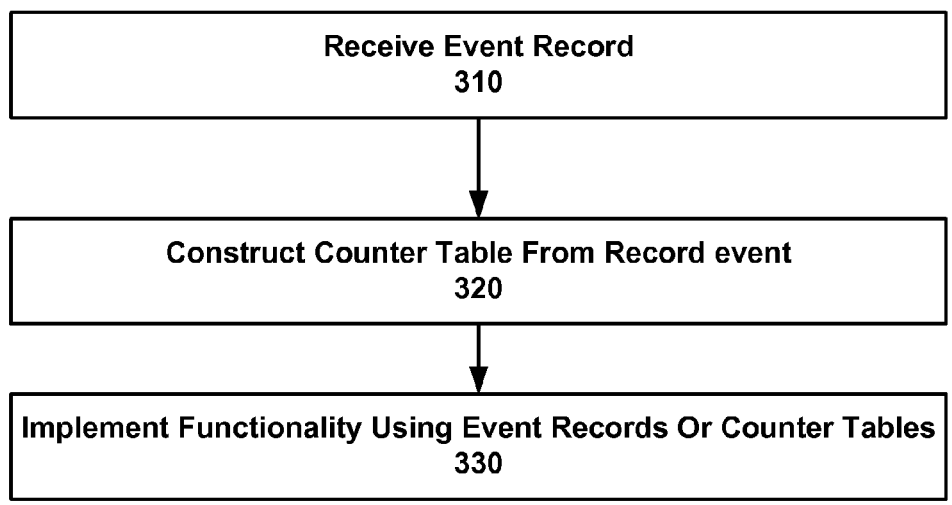
FIG. 3 illustrates a method for operating a processing resource in the implementation of a software defined network, using output from a network switch.

FIG. 3 illustrates a method for operating a processing resource in the implementation of an SDN, using output from a network switch. An example method such as described can be implemented using, for example, components described with system 100 of FIG. 1. Accordingly, reference is made to elements of FIG. 1 for purpose of illustrating a suitable component for performing a step or sub-step being described.

In one example, the processing resource 130 operates to receive a record stream from a switch 100 (310). As noted in FIG. 1, the processing resource 130 can be external to the switch 100. The record stream 131 can be loaded into the DRAM 132. The processing resource 130 can include programming or logic to update counter tables 135 from the record stream 131 (320).

The processing resource 130 can further include programming to associate functionality with the counter tables 135 that are updated based on records from the record stream 131 (330). As examples, the processing resource 130 can associate triggers with counters of the counter tables 135 to detect the occurrence of certain events or conditions, such as when flows become significant. Such triggers can define, for example, thresholds on the number of packets for a flow, or the number of bytes. As an addition or variation, the triggers can be based on per-flow packet rates or byte rates. The processing resource 130 can include programming to perform additional calculations that would be needed for implementing such triggers.

As an addition or variation, the processing resource 130 can filter event records received from the switch 100 based on software configuration. For example, the processing resource 130 can be programmed to discard certain event records based on filter conditions specified by possible extension to OpenFlow. As still another variation, the compression component 124 can filter event records prior to transmission to the processing resource 130.

As another example, processing resource 130 can be programmed to support multi-flow triggers. For example, a trigger can be implemented to generate a report when any subset of a set of flows reaches a threshold. A multi-flow trigger can be implemented to support, for example, a security policy, such as one in which a report is generated when a subset of connections to a given Web server together account for a predetermined amount of download traffic. Another multi-flow trigger can inspect the relative rates for a set of flows, such as to detect unfair bandwidth usage. The use of processing resource 130 enables multi-flow triggers, which would be infeasible under the conventional approach in which counter tables are maintained on an ASIC.

As another example, the processing resource 130 can be programmed to generate a report when an arrival rate of the new flow in a certain category exceeds a predetermined threshold. For example, virus detection or throttling can be implemented using triggers that are based on abnormal connection-establishment rates. In implementation, processing resource 130 can report to controller 140 all-new TCP connection attempts.

As another example, the processing resource 130 can be implemented in a hybrid environment that includes conventional management tools. However, the processing resource 130 can be used as a mechanism to externally manage functions otherwise performed on the switch 100. Such a configuration would conserve resources of the ASIC for switch 100.

Although illustrative embodiments have been described in detail herein with reference to the accompanying drawings, variations to specific embodiments and details are encompassed by this disclosure. It is intended that the scope of embodiments described herein be defined by claims and their equivalents. Furthermore, it is contemplated that a particular feature described, either individually or as part of an embodiment, can be combined with other individually described features, or parts of other embodiments. Thus, absence of describing combinations should not preclude the inventor(s) from claiming rights to such combinations.

What is claimed is:

1. A method for implementing a Software Defined Network, the method comprising:
    associating each corresponding data packet, of a plurality of data packets received on a network switch, with a corresponding event record that identifies one or more flow table rules for the corresponding data packet;
    storing event records, including the corresponding event record, in a local buffer of the network switch;
    when the event records in the local buffer reach a buffer threshold, transmitting the event records to a programmable resource for use in controlling the Software Defined Network, each of the event records corresponding to one or more of the plurality of data packets; and
    storing a plurality of counter tables, each comprising a plurality of counters, in a memory resource utilized by the programmable resource, the plurality of counters being determined from the event records that are transmitted from the network switch.

2. The method of claim 1, further comprising compressing the event records before transmitting the event records to the programmable resource.

3. The method of claim 1, wherein the corresponding event record associated with the corresponding data packet specifies a size of the corresponding data packet.

4. The method of claim 1, wherein the corresponding event record associated with the corresponding data packet specifies a time stamp when the corresponding data packet was received at the network switch.

5. The method of claim 1, wherein the programmable resource is external to the network switch.

6. The method of claim 5, wherein the programmable resource comprises (i) a Dynamic Random Access Memory (DRAM) resource to receive the event records and store the plurality of counter tables, and (ii) a processing unit to unpack the event records and update the plurality of counters in each of the plurality of counter tables based on the unpacked event records.

7. The method of claim 6, wherein the event records are streamed from a direct memory access (DMA) component of the network switch to the programmable resource.

8. The method of claim 7, wherein the processing unit is a central processing unit that operates to read the streamed event records from the DMA component of the network switch.

9. The method of claim 6, further comprising implementing one or more triggers for controlling the Software Defined Network based on a counter threshold determined from the updated plurality of counters, the one or more triggers causing the programmable resource to (i) generate a report for a system controller for managing the Software Defined Network, (ii) implement a security policy, or (iii) inspect flow rates on the network switch.

10. A network switch for a Software Defined Network, comprising:
a flow table;
an event record generator to determine a corresponding event record for an incoming data packet, the event record generator referencing the incoming data packet to an entry for the flow table in order to determine a rule number for the incoming data packet, the corresponding event record for the incoming data packet identifying the rule number and a size of the incoming data packet;
a local buffer to store event records, including the corresponding event record, for a plurality of data packets; and
a transmission component that transmits the event records from the local buffer to an external programmable resource when the event records in the local buffer reach a buffer threshold;
wherein the external programmable resource is to access a plurality of counters stored in a memory resource, and wherein the plurality of counters are to be determined from the event records transmitted from the network switch.

11. The network switch of claim 10, further comprising a compression component that compresses the event records stored in the local buffer.

12. The network switch of claim 10, wherein the transmission component includes a direct memory access (DMA) component that streams the event records to a memory resource of the external programmable resource.

13. A switching system for a Software Defined Network, the switching system comprising:
a programmable resource;
a memory associated with the programmable resource; and
a network switch that is a separate physical component from the programmable resource, the network switch comprising:
a flow table;
an event record generator to determine a corresponding event record for an incoming data packet, the event record generator referencing the incoming data packet to an entry for the flow table in order to determine a rule number for the incoming data packet, the corresponding event record for the incoming data packet identifying the rule number and a size of the incoming data packet;
a local buffer to store event records, including the corresponding event record, for a plurality of data packets; and
a transmission component that transmits the event records from the local buffer to the memory of the programmable resource when the event records in the local buffer reach a buffer threshold;
wherein the programmable resource is to access a plurality of counters stored in the memory, and wherein the plurality of counters are to be determined from the event records transmitted from the network switch.

14. The switching system of claim 13, further comprising a controller, and:
wherein the programmable resource constructs the plurality of counters from the event records transmitted from the transmission component, and defines one or more triggers based on a threshold condition that is defined from one or more counters in the plurality of counters; and
wherein the programmable resource communicates the one or more triggers to the controller in order to implement one or more policies that are associated with the threshold condition.

* * * * *